(12) United States Patent
Mueller-Weinfurtner

(10) Patent No.: US 7,912,162 B2
(45) Date of Patent: Mar. 22, 2011

(54) INITIAL SYNCHRONIZATION FOR RECEIVERS

(75) Inventor: Stefan Mueller-Weinfurtner, Nuremberg (DE)

(73) Assignee: NXP B.V., Eindhoven (NL)

( * ) Notice: Subject to any disclaimer, the term of this patent is extended or adjusted under 35 U.S.C. 154(b) by 1031 days.

(21) Appl. No.: 10/572,473

(22) PCT Filed: Sep. 14, 2004

(86) PCT No.: PCT/IB2004/051750
§ 371 (c)(1),
(2), (4) Date: Mar. 20, 2006

(87) PCT Pub. No.: WO2005/029722
PCT Pub. Date: Mar. 31, 2005

(65) Prior Publication Data
US 2006/0280273 A1 Dec. 14, 2006

(30) Foreign Application Priority Data

Sep. 23, 2003 (EP) ..................................... 03103520

(51) Int. Cl.
*H04L 7/00* (2006.01)
(52) U.S. Cl. ......... 375/354; 375/145; 375/150; 375/343; 375/368
(58) Field of Classification Search .................. 375/354, 375/145, 150, 343, 368
See application file for complete search history.

(56) References Cited

U.S. PATENT DOCUMENTS

| | | | | |
|---|---|---|---|---|
| 5,343,498 A | * | 8/1994 | Toy et al. | 375/259 |
| 5,710,792 A | * | 1/1998 | Fukawa et al. | 375/229 |
| 6,504,883 B1 | * | 1/2003 | Morimoto et al. | 375/343 |
| 6,549,565 B1 | * | 4/2003 | Buehrer et al. | 375/142 |
| 2002/0054583 A1 | * | 5/2002 | Olesen et al. | 370/336 |
| 2003/0072357 A1 | | 4/2003 | Demir et al. | |
| 2004/0156422 A1 | * | 8/2004 | Liljestrom | 375/148 |
| 2004/0161022 A1 | * | 8/2004 | Glazko et al. | 375/152 |

FOREIGN PATENT DOCUMENTS

| | | |
|---|---|---|
| EP | 0 854 588 A2 | 7/1998 |
| JP | 10-13392 A | 1/1998 |
| JP | 2002-165275 A | 6/2002 |
| JP | 2003-501875 A | 1/2003 |
| WO | 00/74290 A1 | 12/2000 |
| WO | 01/17137 A1 | 3/2001 |
| WO | 01/33753 A1 | 5/2001 |
| WO | 01/63775 A2 | 8/2001 |
| WO | 02/29978 A2 | 4/2002 |
| WO | 02/32067 A1 | 4/2002 |
| WO | 03/032512 A1 | 4/2003 |

OTHER PUBLICATIONS

Morelli, M. et al. "Frequency Estimation for the Downlink of the UMTS-TDD Component", IEEE Trans. on Wireless Communications, vol. 1, No. 4, pp. 554-557 (Oct. 2002).

* cited by examiner

*Primary Examiner* — Shuwang Liu
*Assistant Examiner* — Kabir A Timory

(57) ABSTRACT

Methods, apparatus, systems and devices are implemented according to a number of embodiments. According to one such embodiment, a method of synchronizing a receiver to a timing and carrier frequency of a communication system is implemented. A set of predetermined possible synchronization patterns is detected in a received signal. Timing and structure information is generated specifying the occurrence of detected ones of said predetermined set of possible synchronization patterns in said received signal. Channel coefficient estimations of different receiving channels are derived from the timing and structure information. A carrier frequency offset is determined for the received signal based on a comparison of predetermined ones of said derived channel coefficient estimates.

18 Claims, 3 Drawing Sheets

INITIAL SYNCHRONIZATION FOR RECEIVERS

BACKGROUND OF THE INVENTION

The present invention relates to a method and apparatus for synchronizing a receiver to a timing and carrier frequency of a communication system, specifically to an initial synchronization of a wireless receiver in a code division multiple access (CDMA) system with time-division duplex (TDD) for payload data transmission.

In CDMA, each user is assigned a unique code sequence it uses to encode its information-bearing signal. The receiver, knowing the code sequence of the user, decodes a received signal after reception and recovers the original signal. This is possible since the cross-correlations between the code of the desired user and the codes of other users are small. Since the bandwidth of the code signal is chosen to be much larger than the bandwidth of the information-bearing signal, the encoding process enlarges or spreads the spectrum of the signal and is therefore also known as spread-spectrum modulation. The rate of the CDMA signal is called the chip rate, wherein one chip denotes one symbol when referring to spreading code signals. After transmission of the CDMA signal, the receiver typically uses coherent demodulation to despread the CDMA signal, using a locally generated code sequence. To be able to perform the despreading operation, the receiver must not only know the code sequence used to spread the signal, but the codes of the received signal and the locally generated code must also be synchronized. This synchronization must be accomplished at the beginning of the reception and maintained until the whole signal has been received.

Time-Division Synchronous Code-Division Multiple Access (TD-SCDMA) and TD-SCDMA System for Mobile (TSM) are $3^{rd}$ generation (3G) and $2.5^{th}$ generation (2.5G) standards for mobile communication, respectively, for which products are currently under development. These standards support broadband packet-based transmission of text and multimedia data—such as audio, video and digitized voice—at a high data rate. The physical layer of both standards is widely identical and is based on CDMA with TDD for payload data transmission. This transmission standard specifies that each base station (BTS) transmits a unique 64 chip synchronization sequence SYNC to help the terminal device or user equipment (UE) in frame, frequency, and block synchronization.

For spectral efficiency, a target for cellular deployment is a frequency reuse factor equal to one, like it is done in other CDMA systems. This means that neighboring cells use the same carrier frequency and therefore cause mutually interfering signals at the UE. It is one special feature of TD-SCDMA that BTSs are frame-synchronized so that the received SYNC signal portion is corrupted by slightly time shifted interfering SYNC signals from neighboring cells, which degrades timing results and frequency estimates obtained from simple state-of-the-art correlation algorithms. As a further complication, all channels suffer from multipath propagation.

The carrier frequency is currently estimated by exploiting the SYNC of a single BTS by a correlation technique, which is close to optimum in non-dispersive channels with white noise, i.e., without interference. However, simple correlation degrades in dispersive (i.e., multipath) channels and breaks down in strong interference.

In "Frequency Estimation for the Downlink of the UMTS-TDD Component", Michele Morelli et al, IEEE Transactions on Wireless Communications, pp. 554-557, vol. 1, no. 4, October 2002, an estimator is proposed which solves the multipath problem by using least-squares (LS) channel estimation (CE) based on the transmitted SYNC signal. The estimator then computes the frequency estimate from phase differences between corresponding channel taps estimated from different portions of SYNC. The authors described their algorithm for the training sequence of the high chip rate TDD option in the 3GPP ($3^{rd}$ Generation Partnership Project) specification TS 25.223, i.e., not for TD-SCDMA, and estimation is based on the training signal from one single BTS, only.

The start of the block is usually detected by a correlation of detected SYNC phases with the specified phase sequence, in a so-called matched filter, which indicates the start of the block if the output is large. Commonly, the correlation window has fixed size and a threshold is used to decide the block start from the correlation result.

However, because TD-SCDMA is a CDMA system, high frequency efficiency will demand deployment of BTSs with frequency reuse factor equal to one in the long run. This means strong co-channel inter-cell interference, which is not sufficiently suppressed by the relatively short SYNC training sequences provided for frame, frequency, and block synchronization. All state-of-the-art frequency estimators strongly degrade in the presence of inter-cell interference and will not allow reliable synchronization in cellular systems with a reuse factor equal to one. Also the SYNC phase detection for block synchronization can suffer from interference.

SUMMARY OF THE INVENTION

It is an object of the present invention to provide a synchronization apparatus and method, by means of which robust synchronization can be achieved even in cases of strong co-channel inter-cell interference.

This object is achieved by a synchronization apparatus as claimed in claim 1 and by a synchronization method as claimed in claim 15.

Accordingly, by detecting possible synchronization patterns of different receiving channels and generating the timing and structure information, inter-cell interference can be taken into account so that the proposed synchronization scheme can either suppress it or can realize an additional macro diversity gain from "interfering" BTSs. A very robust frequency estimation results, which is one essential receiver building block to engineer UEs, and which allows for spectrally efficient cellular network deployment with frequency a reuse factor equal to one.

The proposed robust synchronization scheme identifies all those BTSs, which might provide helpful signal components for initial synchronization. In cell-boundary situations, i.e., at least two BTS signals are received at comparable power levels, this will cause an increased signal-to-interference ratio. This is in contrast to the initially described state-of-the-art synchronization scheme, in which BTSs other than the target BTS are treated as interfering noise. The proposed frequency estimation algorithm realizes an advantage in cellular scenarios by treating the interfering BTSs as signals with known structure to suppress or use it for the estimation task. A macro diversity gain can thus be realized for frequency estimation, which makes initial synchronization at cell boundaries easily possible and fast. The time between switching on the handset and having a network available can be reduced.

But even in single-cell scenarios, the robust channel coefficient estimation (CCE) is advantageous, since the dimensionality of the estimation task is adapted by the proposed generation of the timing and structure information. The corresponding reduction of the parameter set to the number of actually expected non-zero channel coefficients leads to better noise reduction in the parameter estimates. This dimensionality adaptation and the fact that the estimated channel coefficients need not be consecutive and also need not be from one-and-the-same BTS-to-UE channel is in contrast to the initially described prior art, where consecutive channel taps from the same BTS-to-UE channel in an estimation window of fixed size are estimated.

Furthermore, the proposed generation of the timing and structure information can lead to a lower average dimensionality of the estimation problem, which translates with third power into the effort for matrix inversion, so that average computational load is reduced.

Each of the possible synchronization patterns may specify a corresponding signal source. Then, inter-cell interference can be detected and taken into account for suppression or utilization of the interfering signal component.

A list of sequence numbers of detected synchronization patterns and associated time positions may be determined, e.g., by the detection means. The determined list can be transferred into system matrices which reflect the timing and structure information. In particular, only such synchronization patterns can be detected, that have been received at a level higher than a predetermined level. Additionally, the detection function or means can be arranged to identify an occurrence of an echo of a detected synchronization pattern.

Furthermore, a predetermined number of channel coefficient estimations may be derived from predetermined portions of a detected synchronization pattern using the timing and structure information. As an example, two channel coefficient estimations may be derived from respective first and second halves of the detected synchronization pattern.

The determination of the frequency offset may be based on a determination of a correlation of predetermined channel coefficient estimates and a determination of a phase difference between the channel coefficient estimates. Optionally, the correlation results may be averaged over a predetermined number of frames of the received signal before determining the phase difference.

In an additional means or functionality, the start of a channel block may be detected in the received signal based on at least one previously derived channel coefficient estimation. As an example, this may be achieved by correlating at least one previous channel coefficient estimation with a corresponding current channel coefficient estimation. The current channel coefficient estimation may be derived from a channel tap estimate obtained for example, from a midamble in the first time slot (i.e., TS0) of a frame of the received signal. The at least one previous channel coefficient estimation may be obtained from the first half of a corresponding detected synchronization pattern.

The proposed block synchronizing functionality can use the channel coefficient estimations derived during frequency estimation to generate synchronization phase estimates but may also work with all other suitable synchronization phase estimates. In contrast to standard techniques for finding the block start, it may be based on a modulo-4 complex correlation accumulator unit, which realizes an extending correlation window for improved reliability. Based on these accumulators, the synchronizer implements two stages for block synchronization. First, it finds out the best of four radio frame phases (i.e., 4-frame rhythm) since the block start coincides with frame numbers being a multiple of four. The final start-of-block detection then features the threshold-based (thr2) hypothesis test with both specified SYNC phase sequences conditioned on being in the best frame phase, which decisively reduces false alarms.

The block synchronizer can be used separately, or it may exploit channel coefficient estimates computed during the frequency estimation to obtain robust SYNC phase modulation estimates.

Further advantageous modifications are defined in the dependent claims.

BRIEF DESCRIPTION OF THE DRAWINGS

The present invention will now be described on the basis of a preferred embodiment with reference to the accompanying drawings, in which.

DETAILED DESCRIPTION OF THE INVENTION

The preferred embodiment will now be described on the basis of a power-efficient UE receiver unit with frequency-efficient reuse-one capability for a CDMA system with frame-synchronous cellular deployment of intra-frequency BTSs. The proposed robust synchronization scheme enables the UE's synchronization unit to deal with the frequency-efficient reuse-equal-to-one case. In particular, a robust frequency and start-of-block estimator will be described which improves and accelerates initial cell search and synchronization of the UE in cellular mobile communications according to the TD-SCDMA or TSM standard. The training sequence to be exploited by both schemes is standardized for TD-SCDMA, e.g. low chip rate TDD option as defined in the 3GPP specification TS 25.223: Universal Mobile Communications System (UMTS); Spreading and Modulation (TDD), or for TSM systems in the China Wireless Telecommunication Standard (CWTS) specification TSM 05.02: 3G Cellular Telecommunications System; TD-SCDMA System for Mobile (TSM); Multiplexing and Multiple Access on the Radio Path.

The UE must be able to identify the SYNC sequence numbers, which are most likely present in the received signal portion and also detect their position in time. The algorithm for sequence number detection and frequency estimation has to work in scenarios with (severe) multipath propagation. To deploy TSM BTSs with a frequency reuse factor equal to one, the UE should be able to cope with co-channel SYNC code interference from neighboring cells or sectors using the same carrier frequency.

Figure 1:
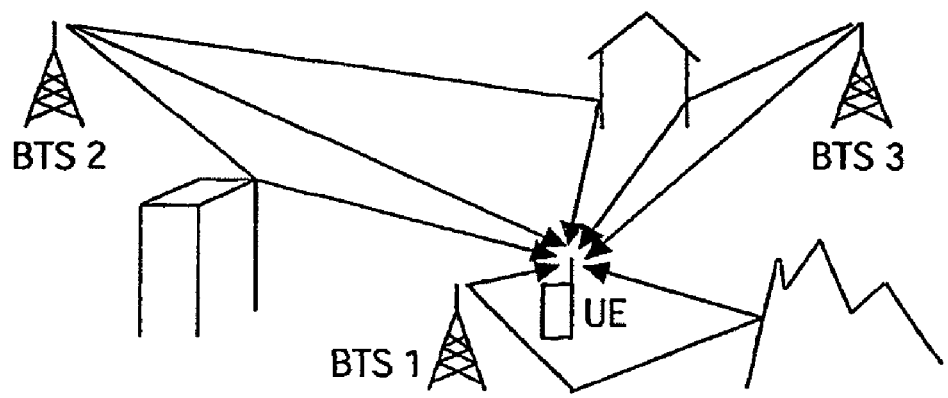
FIG. 1 shows a schematic diagram of a communication scenario with multi-cell interference.

FIG. 1 shows a communication situation or scenario with multi-cell interference caused by data channels between a UE and three BTSs. The UE tries to synchronize on BTS 1, while BTS 2 and BTS 3 act as co- or adjacent-channel interferers and the three effective channels from BTS 1, 2, and 3 to the UE all suffer from multipath propagation caused by reflections at different kinds of obstacles, such as buildings or mountains. Hence, information on neighboring cells can be signaled from the protocol layer and might be useful in identifying the available BTS signals in the received signal.

The RF frequencies of BTSs should be very accurate with a maximum relative error of 0.05 ppm, i.e. 100 Hz at a carrier frequency of 2 GHz. With maximum vehicle speeds of 120 km/h, the maximum Doppler shift is limited to approximately 230 Hz. As a consequence, carrier frequencies from different co-channel BTSs can be assumed to be widely identical for Initial Frequency Offset Estimation (IFOE) purposes, which usually targets an output error of 1 kHz, with another finer frequency offset estimation stage following this one. For higher Doppler frequencies or more challenging accuracy requirements for IFOE output, the estimation process may also be modified to concentrate on signal components from the target BTS, only, and simply suppress the other components.

In the following, it is assumed that B BTSs contribute mutually different SYNC signal components of significant power to the UE. The effective training signal expected at the UE from BTS number b during the downlink pilot time slot (DwPTS) of a specific radio frame is given by $s_b[k]$, $0 \leq k < 64M$, where k is the discrete sample index and M is the oversampling factor. If $M>1$, this sequence should include the influence of transmit and receive filtering and it then will also be advantageous to slightly extend the time interval to the left and right in order to accommodate filter transients. Outside this training interval, zeros are sent.

The number of multipath components received from BTS b shall be denoted by $N_b$ and the sorted list of multipath delays from that BTS is given by $\kappa_{b,1} < \kappa_{b,2} < \ldots < \kappa_{b,N_b}$. Associated channel coefficients for BTS b are given by $h_b\lfloor \kappa_{b,1} \rfloor \ldots h_b\lfloor \kappa_{b,N_b} \rfloor$. The total power received from that BTS is $P_b = \Sigma_{n=1}^{N_b} |h_b[\kappa_{b,n}]|^2$. Without restriction of generality, it can be assumed that $P_1 \geq P_b$, $2 \leq b \leq B$, so that BTS 1 is the "desired" BTS, while the others are "interfering" BTSs with lower total power, each. Assuming a carrier frequency offset v, the received signal at discrete time k (sampling interval $T_s = T_c/M$ with chip interval $T_c$) can be written as:

$$r[k] = \exp(j2\pi\nu T_s k) \sum_{b=1}^{B} \sum_{n=1}^{N_b} h_b[\kappa_{b,n}] p_b s_b[k - \kappa_{b,n}] + n[k], \quad (1)$$

where the complex value $p_b$ is the unknown SYNC phase modulation ($|p_b|=1$) applied by basestation b in the considered frame. Since the BTSs are frame-synchronous but not necessarily block-synchronous, the phase modulation of SYNC from different BTSs can be different n[k] is additive noise, which consists of adjacent channel interference and Gaussian noise and as long as unsuppressed co-channel interference is present, the adjacent channel interference can be neglected, because co-channel influence will usually dominate.

Figure 2:
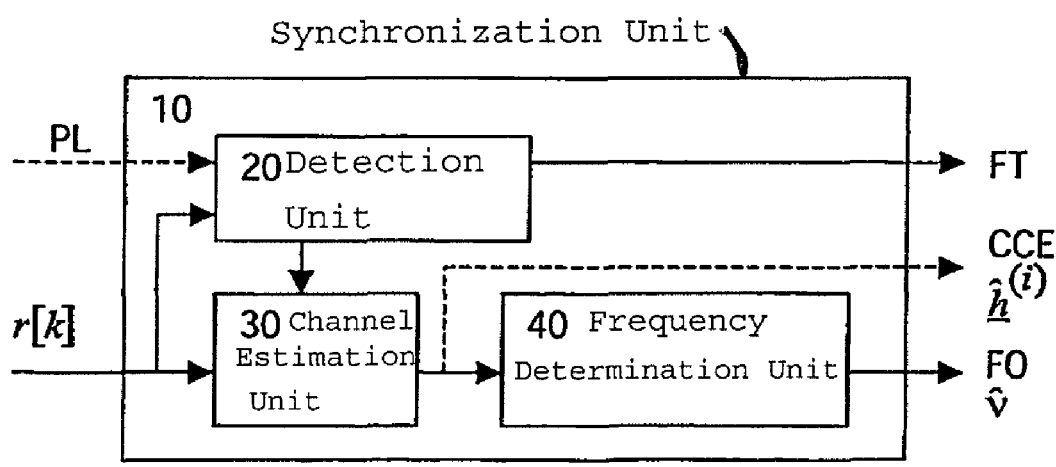
FIG. 2 shows a schematic block diagram of a synchronization apparatus according to the preferred embodiment.

FIG. 2 shows a schematic block diagram of a synchronization unit 10 with the proposed frequency estimation functionality.

The synchronization unit 10 comprises a detection function or unit 20 to which the received signal is supplied and which is arranged to identify all those SYNC sequences, which are received with significant power level together with their relevant multipath delays, i.e., positions of echoes for those particular SYNC sequences. This can be attained, e.g., by correlation with SYNC sequences and optional averaging over multiple frames. The result is a finite list of pairs providing information about SYNC sequence number and associated time position, e.g. a frame timing FT. To narrow down the set of possible SYNC sequence numbers, any available information from the protocol layer PL may optionally be used advantageously to define the set of possible SYNC sequence numbers. This list is then transformed into system matrices, which reflect all timing and structure information available on the received signal. This procedure can therefore be called "Signal Structure and Timing Estimation".

Furthermore, the received signal is supplied to a channel estimation function or unit 30 arranged for channel coefficient estimation (CCE), which in best mode for TD-SCDMA, may involve computation of two CCEs from the first half and second half of the SYNC sequence, respectively, by exploiting the knowledge from the system matrices generated in the detection unit 20. Alternatively, more than two CCEs can be obtained. Besides frequency estimation, the CCEs can optionally be used for cell-selection and for detection of the block start as described later in connection with FIG. 5.

Contrary to the initially described prior art where estimates of a fixed number of consecutive coefficients, i.e. fixed-size estimation window, of one and the same BTS-to-UE channel are obtained, the present channel estimation unit 30 provides a much more flexible CCE, which estimates an adaptive number of arbitrary non-consecutive channel coefficients from different BTS-to-UE channels.

The obtained CCEs are supplied to a frequency determination or estimation unit 40 in which a frequency offset FO is estimated by phase difference computation between the CCES, which can be achieved e.g. by correlating the CCEs and computing the phase angle of the correlation result. Depending on accuracy requirement and LUE velocity, channel coefficients from others than the desired BTS can either be suppressed or be utilized to obtain a macro diversity gain for the frequency estimation. Further, it is advantageous to average the correlation results over multiple frames before phase angle computation.

Figure 3:
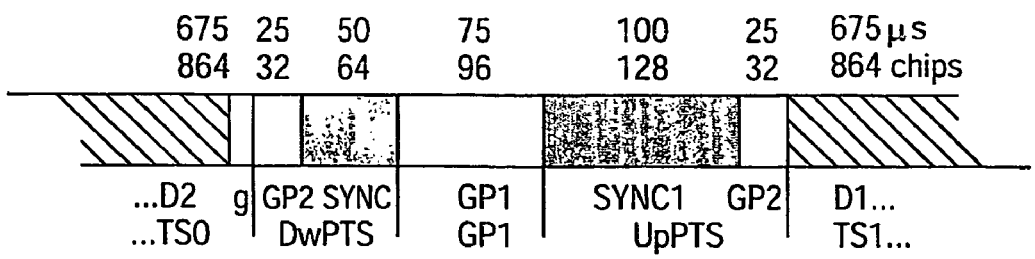
FIG. 3 shows a diagram indicating a portion of a TD-SCDMA radio frame structure used for synchronization in the preferred embodiment.

FIG. 3 shows details of a portion of the frame structure of the TD-SCDMA radio frame to be used for frame and frequency synchronization. The duration of a radio frame is 5 ms (6400 chips) and it consists of seven data time slots (TS0 through TS7) and a special portion to be used for frame and frequency synchronization. Its structure and location in the frame between data part 2 (D2), which corresponds to the chips after midamble MA (shown in FIG. 4), of the first data time slot TS0 and data part 1 (D1), which correspond to the chips before the midamble MA, of TS1 is shown in FIG. 3. During the downlink pilot time slot DwPTS, the BTS transmits one out of a set of known SYNC sequences of 64 chips length, which have good correlation properties to enable frame synchronization, e.g., by finding the position of maximum correlation. Frequency synchronization is also possible from the SYNC sequence, e.g., by estimating the phase rotation from chip to chip within the SYNC sequence. Neighboring BTSs should use different SYNC sequences to minimize mutual interference.

A broadcast control channel (BCCH) block occurs every 48 radio frames (240 ms) and this event needs to be detected and the BCCH needs to be read in order to obtain important network information during initial cell search. The procedure to find the BCCH is called block synchronization and for this purpose, the entire SYNC sequence is phase-modulated by the BTS with a phase value, changing from frame to frame. The phase reference for SYNC is the midamble MA in the previous TS0 of the same frame. An estimate of the phase is obtained in the UE by observing the midamble MA together with the following SYNC, both received from the same BTS. Two different sets of four successive SYNC phases are specified, which indicate a start and no start of the BCCH block, respectively.

Figure 4:
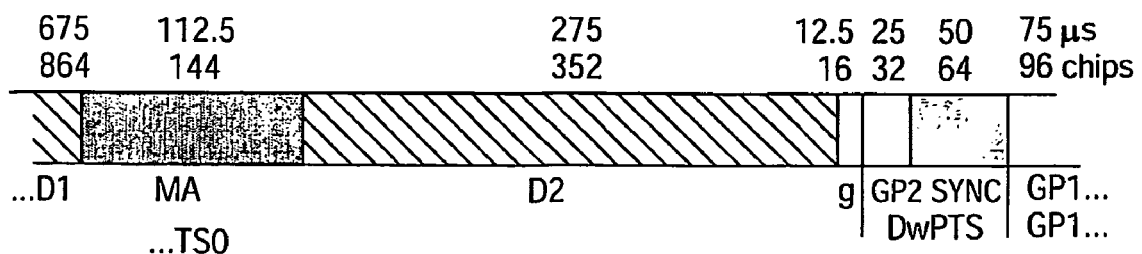
FIG. 4 shows a diagram indicating another portion of the TD-SCDMA radio frame structure used for a start-of-block detection according to the preferred embodiment.

FIG. 4 shows the respective detail of the TD-SCDMA radio frame farther to the left of the portion shown in FIG. 3. This portion of the TD-SCDMA radio frame comprises the midamble MA of TS0 and SYNC to be used for SYNC phase detection required for start-of-block detection. FIGS. 3 and 4 show that there are sufficient zero-chips, i.e. guard periods GP1, GP2 and g around SYNC to accommodate moderate mutual time shifts of SYNC sequences received at the UE from different BTSs due to different propagation times. A propagation path length difference of 234 m corresponds to one chip.

The proposed synchronization scheme based on frequency estimation relies on a frame-synchronous operation of the cellular BTS, which is anyhow the recommended mode of operation in both standards, so that general applicability is ensured.

The following mathematical description relates to a specific mode with two CCEs so that the received samples in the first and second half of the SYNC signal are given by:

$$\underline{r}^{(i)} = \underline{\Phi} \underline{A}^{(i)} \underline{h}^{(i)} + \underline{n}^{(i)}, \quad i=1,2, \quad (2)$$

where $\underline{r}^{(1)} = [r[\kappa_l] \ldots r[\kappa_l+32M-1]]^T$ and $\underline{r}^{(2)} = [r[\kappa_l+32M] \ldots r[\kappa_l+64M-1]]^T$ and $$\kappa_l = \min_{1 \leq b \leq B} \kappa_{b,1}$$

is the time index of the leftmost channel coefficient received from all BTSs. The two system matrices are given by:

$$\underline{A}^{(i)} = [\underline{s}_1^{(i)}[\kappa_{1,1}-\kappa_l] \ldots \underline{s}_1^{(i)}[\kappa_{1,N_1}-\kappa_l] \ldots \\ \underline{s}_B^{(i)}[\kappa_{B,1}-\kappa_l] \ldots \underline{s}_B^{(i)}[\kappa_{B,N_B}-\kappa_l]], \quad i=1,2$$

and are constructed column-wise from the known partial SYNC sequence vectors $$\underline{s}_b^{(1)}[x] = [\underbrace{0 \ldots 0}_{x} \; s_b[0] \; \cdots \; s_b[32M-1-x]]^T$$

and $$\underline{s}_b^{(2)}[x] = [s_b[32M-x] \ldots s_b[64M-1-x]]^T (x \geq 0).$$

The two vectors with channel coefficients (and unknown SYNC phase modulation) are given by:

$$\underline{h}^{(1)} = \exp(j2\pi v 16 T_c)[p_1 h_1[\kappa_{1,1}] \ldots p_1 h_1[\kappa_{1,N_1}] \ldots p_B h_B \\ [\kappa_{B,1}] \ldots p_B h_B[\kappa_{B,N_B}]]^T$$

and $$\underline{h}^{(2)} = \exp(j2\pi v 32 T_c)\underline{h}^{(1)}.$$

The Diagonal Phase Rotation Matrix:

$$\underline{\Phi} = \text{diag}[\exp(j2\pi v(\kappa_l-16M)T_s) \ldots \exp(j2\pi v(\kappa_l+16M-1)T_s)]$$

models the increasing phase rotation due to frequency offset but it is now approximated by the identity matrix and the two (least-squares) LS CCEs can be obtained as follows:

$$\underline{\hat{h}}^{(i)} = (\underline{A}^{(i)H}\underline{A}^{(i)})^{-1}\underline{A}^{(i)H}\underline{r}^{(i)}, \quad i=1,2. \quad (3)$$

Alternatively, a minimum mean-squared error (MMSE) CCE can be obtained by:

$$\underline{\hat{h}}^{(i)} = (\underline{A}^{(i)H}\underline{A}^{(i)}+R)^{-1}\underline{A}^{(i)H}\underline{r}^{(i)}, \quad i=1,2, \quad (4)$$

with R being the noise covariance matrix, but it will be hard to have a noise power estimate available at this time instant during initial synchronization. Further, noise will be colored if oversampling is used. The channel coefficient estimation can be performed on-line by full reuse of zero-forcing block linear equalizer (ZF-BLE) subroutines, which are usually present in joint data detection TD-SCDMA receivers. These routines are idle during IFOE so that these resources can be used for synchronization. The dimension of the matrices in IFOE can be chosen such that they comply with ZF-BLE for perfect reuse.

The full macro diversity frequency estimate which exploits all signal components for estimation is obtained via the phase angle of the inner vector product (i.e., correlation of CCEs) as:

$$\hat{v} = \arg(\underline{\hat{h}}^{(1)H}\underline{\hat{h}}^{(2)})/(2\pi 32 T_c). \quad (5)$$

It is noted that the unknown phase modulation(s) of the SYNC sequence will cancel by multiplying the complex conjugated first CCE with the second CCE. In case that mutual Doppler shifts for propagation paths from different BTS are too large due to high vehicle speeds, the IFOE can also be estimated from a partial inner product:

$$\hat{v} = \arg(\underline{\hat{h}}^{(1)H}B\underline{\hat{h}}^{(2)})/(2\pi 32 T_c) \quad (6)$$

with channel coefficients belonging to one and the same target BTS, only. Matrix B is the appropriate diagonal masking matrix with diagonal entries taken from the set of values $\{0, 1\}$, only. With this masked estimator, interference from the other BTSs is suppressed, but no macro diversity gain for the frequency estimate is realized from those signal contributions.

After frequency offset estimation is completely finished, the near-interference-free CCEs obtained from this procedure can also be used to reliably detect the strongest BTS (i.e., with maximum power sum $P_b$), which can be done by performing:

$$\hat{b} = \underset{1 \leq b \leq B}{\arg\max} \sum_{n=1}^{N_b} \sum_{i=1}^{2} \left|\hat{h}_b^{(i)}[\kappa_{b,n}]\right|^2. \quad (7)$$

An alternative low-complex possibility is:

$$\hat{b} = \underset{1 \leq b \leq B}{\arg\max} \left|\hat{h}_b^{(1)}[\kappa_{b,n}]\right|. \quad (8)$$

Furthermore, the obtained CCEs can be used to detect the phase modulation of the SYNC sequence, which is used to mark the beginning of the BCCH multiframe or block structure in TD-SCDMA.

In the following, an additional optional block start detection unit or function is described with reference to FIG. 5.

Figure 5:
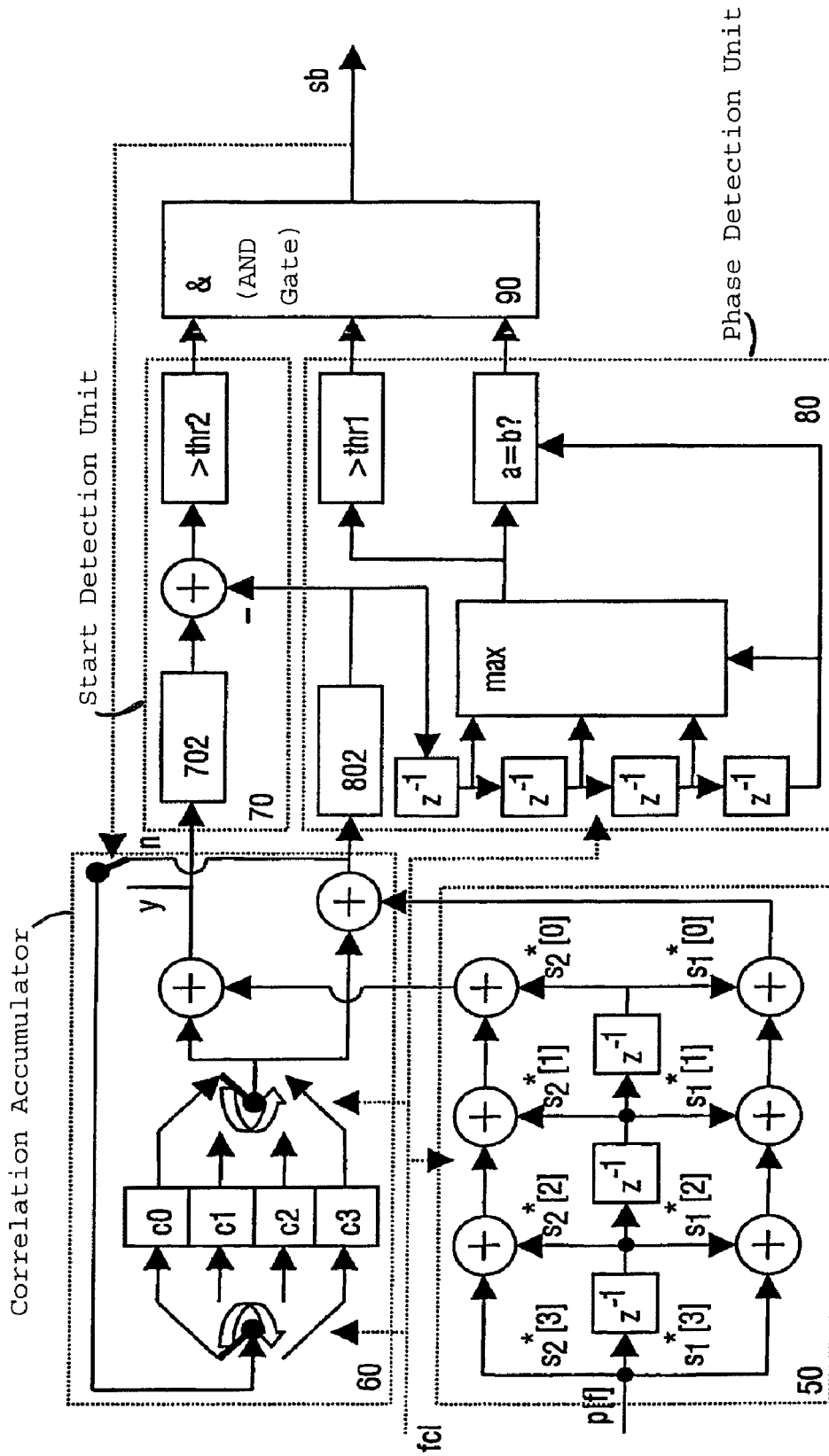
FIG. 5 shows a schematic block diagram of the start-of-block detection according to the preferred embodiment.

FIG. 5 shows a schematic block diagram of the start-of-block detection unit, which can be implemented in hardware or software.

For SYNC phase detection, the CCEs from the previous frequency estimation can be used to correlate them with the respective channel tap estimate obtained from the midamble in TS0, being the phase reference for SYNC. Either the soft decision (SD) may be determined as given by:

$$p_b[f] = \sum_{n=1}^{N_b} \hat{H}_b^*[\kappa_{b,n}]\hat{h}_b^{(1)}[\kappa_{b,n}] \quad (9)$$

or the soft phase decision (SPD) may be determined as given by:

$$p_b[f] = \exp\left(j \arg\left(\sum_{n=1}^{N_b} \hat{H}_b^*[\kappa_{b,n}] \hat{h}_b^{(1)}[\kappa_{b,n}]\right)\right), \quad (10)$$

where $\hat{H}_b[k]$, $k=1, \ldots, 16$, is the channel estimate for the channel paths from BTS b to the UE obtained from the midamble of TS0, while $\hat{h}_b^{(1)}[\kappa_{b,n}]$ are the CCE from the first half of SYNC sequence obtained during frequency estimation. In the presence of channel estimation errors and residual frequency offsets, the latter SYNC phase detector usually leads to better results. For best results in fast fading channels, the CCE obtained from the first half of the SYNC sequence is used for minimum distance between the two channel estimates.

Said or other suitably retrieved SYNC phase values p[f] are input to a correlation unit 50 of the start-of-block detection unit depicted in FIG. 5. Here, $s_1[f]$, $f=0, \ldots, 3$ is the SYNC phase sequence indicating that no BCCH is to be found in the next four radio frames, while $s_2[f]$, $f=0, \ldots, 3$ is the SYNC phase sequence, which signals the presence of a BCCH block. The correlation unit 50 comprises two filters to match the received phase sequence with the two hypotheses. The two outputs of the correlation unit 50 are supplied to respective adder functions, where they are added to respective outputs of a modulo-4 complex correlation accumulator 60, which starts from reset-value zero and realizes an extending correlation window to reliably learn the underlying 4-frame rhythm (best frame phase), first, before deciding that a BCCH block will start. For robust behavior with residual frequency errors, respective metric blocks 702, 802 determine the squared magnitude of the complex correlation. Alternatively, the real part could be used, if frequency synchronization were perfect.

In a best frame phase detection unit 80, a first threshold value thr1 is used to check for sufficient reliability of the four-frame rhythm decision. Furthermore, in a block start detection unit 70, a second threshold value thr2 is used to distinguish between the block start and no block start hypothesis. Via a logical AND gate 90, a decision output sb in favor of the block start is conditioned on compliance with the currently detected four-frame rhythm, the reaching of the first threshold value thr1, and the reaching of the second threshold value thr2. The decision output sb is used to control a switching unit of the complex correlation accumulator 60. This switching unit determines the input signal of the complex correlation accumulator 60. The subunits of the start-of-block detection unit are controlled by the frame clock of the received signal.

As already mentioned the block diagram depicted in FIG. 5 can be realized in hardware, but also in software where each subblock may correspond to a subroutine controlling a signal processor or the like.

The block synchronization scheme can always be applied, since frame-synchronous operation is not needed for the working principle, once suitable SYNC phase estimates are available. Best performance is achieved in frame-synchronized networks and by exploiting channel coefficient estimates computed during the proposed frequency estimation to generate the phase estimates for input to the block synchronizer.

It is noted that the present application is not restricted to the above specific embodiment but can be used in any synchronization unit or procedure which is based on a received synchronization pattern indicating a receiving channel and/or signal source. In particular, all described elements of the synchronization scheme can be implemented as hardware circuit or, alternatively or in combination, as software routines controlling a signal processing device. The preferred embodiments may thus vary within the scope of the attached claims.

The invention claimed is:

1. A synchronization apparatus for synchronizing a receiver to a timing and carrier frequency of a communication system, said synchronization apparatus comprising:
    a detection circuit for detecting, in a signal received by said receiver, a set of predetermined possible synchronization patterns, and for generating a timing and structure information specifying occurrences of detected ones of said set of possible synchronization patterns in said received signal;
    a channel estimation circuit for deriving channel coefficient estimations of different receiving channels from said timing and structure information;
    a determination circuit for determining a carrier frequency offset of said received signal based on a comparison of predetermined ones of said derived channel coefficient estimates; and
    a start detection circuit for detecting a start of a channel block in said received signal based on at least one previous channel coefficient estimation derived by said estimation circuit,
    wherein said at least one previous channel coefficient estimation is obtained from a first half of a corresponding detected synchronization pattern.

2. The synchronization apparatus according to claim 1, wherein
    the detection circuit is configured to detect different synchronization patterns for a plurality of different signal sources,
    the channel estimation circuit is configured to derive different channel coefficient estimations for each of at least two different receiving channels, and
    each one of said possible synchronization patterns specifies a corresponding one of the plurality of different signal sources.

3. The synchronization apparatus according to claim 1, wherein said detection circuit is arranged to determine a list of sequence numbers of detected synchronization patterns and associated time positions.

4. The synchronization apparatus according to claim 3, wherein said detection circuit is arranged to transfer said list into system matrices which reflect said timing and structure information.

5. The synchronization apparatus according to claim 1, wherein said detection circuit is arranged to detect synchronization patterns received at a level higher than a predetermined level.

6. The synchronization apparatus according to claim 1, wherein said detection circuit is arranged to identify an occurrence of an echo of a detected synchronization pattern.

7. The synchronization apparatus according to claim 1, wherein said estimation circuit is arranged to derive a predetermined number of channel coefficient estimations from predetermined portions of a detected synchronization pattern using said timing and structure information.

8. The synchronization apparatus according to claim 7, wherein said estimation circuit is arranged to derive two channel coefficient estimations from respective first and second halves of said detected synchronization pattern.

9. The synchronization according to claim 1, wherein said determination circuit is arranged to determine a correlation of predetermined channel coefficient estimates and to determine a phase difference between the correlation results.

10. The synchronization apparatus according to claim 9, wherein said determination circuit is arranged to average said correlation results over a predetermined number of frames of said received signal before determining said phase difference.

11. The synchronization apparatus according to claim 1, wherein said start detection circuit is arranged to correlate said at least one previous channel coefficient estimation with a corresponding current channel coefficient estimation.

12. The synchronization apparatus according to claim 1, wherein said current channel coefficient estimation is derived from a channel tap estimate obtained from a midamble in the first time slot of a frame of said received signal.

13. The synchronization apparatus according to claim 1,
wherein the detection circuit is configured to detect different synchronization patterns for a plurality of different signal sources,
wherein the channel estimation circuit is configured to derive a channel coefficient estimation for each of at least two different receiving channels, therein providing at least two channel coefficient estimations,
wherein each one of said possible synchronization patterns specifies a corresponding one of the plurality of different signal sources, and
further including a receiver configured to synchronize with one of the signal sources, using the determined carrier frequency offset.

14. A synchronization apparatus for synchronizing a receiver to a timing and carrier frequency of a communication system, said synchronization apparatus comprising:
a detection circuit for detecting, in a signal received by said receiver, a set of predetermined possible synchronization patterns, and for generating a timing and structure information specifying occurrences of detected ones of said set of possible synchronization patterns in said received signal;
a channel estimation circuit for deriving channel coefficient estimations of different receiving channels from said timing and structure information;
a determination circuit for determining a carrier frequency offset of said received signal based on a comparison of predetermined ones of said derived channel coefficient estimates; and
a start detection circuit for detecting a start of a channel block in said received signal based on at least one previous channel coefficient estimation derived by said estimation circuit,
wherein said start detection circuit comprises a correlation accumulator unit for obtaining an extending correlation window for improved reliability, best frame detection circuit for determining the best of a predetermined number of frame phases, and a block start detection circuit for performing a threshold-based hypothesis test with synchronization phase sequences conditioned on being located in said determined best frame phase.

15. A synchronization apparatus for synchronizing a receiver to a timing and carrier frequency of a communication system, said synchronization apparatus comprising:
a detection circuit configured and arranged to detect, in a signal received by said receiver, a set of predetermined possible synchronization patterns, and for generating a timing and structure information specifying occurrences of detected ones of said set of possible synchronization patterns in said received signal;
channel estimation circuit for deriving channel coefficient estimations of different receiving channels from said timing and structure information;
a determination circuit for determining a carrier frequency offset of said received signal based on a comparison of predetermined ones of said derived channel coefficient estimates;
a start detection circuit for detecting a start of a channel block in said received signal based on at least one previous channel coefficient estimation derived by said estimation circuit,
wherein said current channel coefficient estimation is derived from a channel tap estimate obtained from a midamble in the first time slot of a frame of said received signal, and
wherein said at least one previous channel coefficient estimation is obtained from a first half of a corresponding detected synchronization pattern.

16. A synchronization apparatus for synchronizing a receiver to a timing and carrier frequency of a communication system, said synchronization apparatus comprising:
a detection circuit configured and arranged to detect, in a signal received by said receiver, a set of predetermined possible synchronization patterns, and for generating a timing and structure information specifying occurrences of detected ones of said set of possible synchronization patterns in said received signal;
channel estimation circuit for deriving channel coefficient estimations of different receiving channels from said timing and structure information; and
a determination circuit for determining a carrier frequency offset of said received signal based on a comparison of predetermined ones of said derived channel coefficient estimates,
wherein said current channel coefficient estimation is derived from a channel tap estimate obtained from a midamble in the first time slot of a frame of said received signal, and
wherein said detection circuit comprises a correlation accumulator unit for obtaining an extending correlation window for improved reliability, a best frame detection circuit for determining a best of a predetermined number of frame phases, and a block start detection circuit for performing a threshold-based hypothesis test with synchronization phase sequences conditioned on being located in said determined best frame phase.

17. A synchronization apparatus for synchronizing a receiver to a timing and carrier frequency of a communication system, said synchronization apparatus comprising:
a detection circuit for detecting, in a signal received by said receiver, a set of predetermined possible synchronization patterns, and for generating a timing and structure information specifying occurrences of detected ones of said set of possible synchronization patterns in said received signal, the detection circuit including a correlation accumulator unit for obtaining an extending correlation window for improved reliability, best frame detection circuit for determining the best of a predetermined number of frame phases, and a block start detection circuit for performing a threshold-based hypothesis test with synchronization phase sequences conditioned on being located in said determined best frame phase;
a channel estimation circuit for deriving channel coefficient estimations of different receiving channels from said timing and structure information; and a determination circuit for determining a carrier frequency offset of said received signal based on a comparison of predetermined ones of said derived channel coefficient estimates.

18. A synchronization apparatus for synchronizing a receiver to a timing and carrier frequency of a communication system, said synchronization apparatus comprising:

a detection circuit configured and arranged to detect, in a signal received by said receiver, a set of predetermined possible synchronization patterns, and for generating a timing and structure information specifying occurrences of detected ones of said set of possible synchronization patterns in said received signal, the detection circuit including a correlation accumulator unit for obtaining an extending correlation window for improved reliability, best frame detection circuit for determining the best of a predetermined number of frame phases, and a block start detection circuit for performing a threshold-based hypothesis test with synchronization phase sequences conditioned on being located in said determined best frame phase;

a channel estimation circuit for deriving channel coefficient estimations of different receiving channels from said timing and structure information; and a determination circuit for determining a carrier frequency offset of said received signal based on a comparison of predetermined ones of said derived channel coefficient estimates, wherein said current channel coefficient estimation is derived from a channel tap estimate obtained from a midamble in the first time slot of a frame of said received signal.

* * * * *